Feb. 19, 1946.  W. WILSON  2,395,082
CONVERTIBLE MOUNTING MEANS FOR PUNCH AND DIE TOOLS
Filed Dec. 24, 1942  7 Sheets-Sheet 1
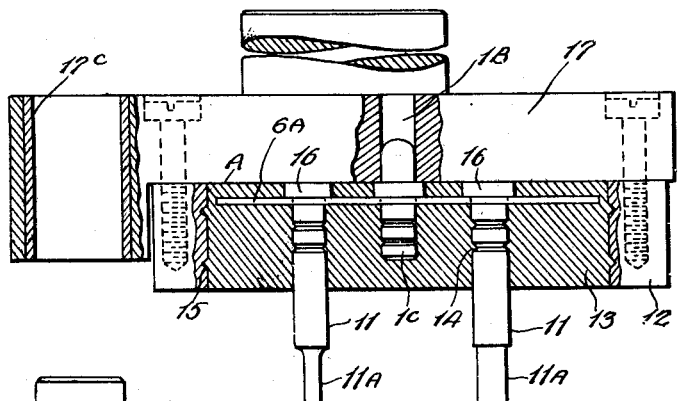
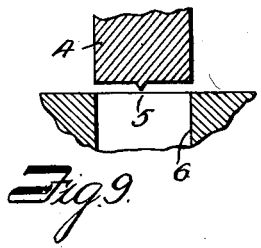
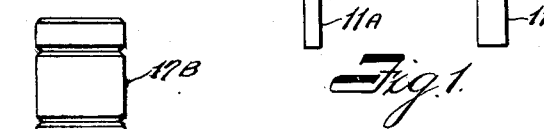
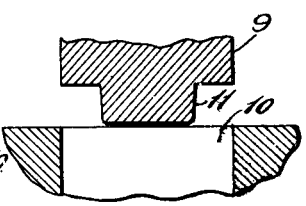
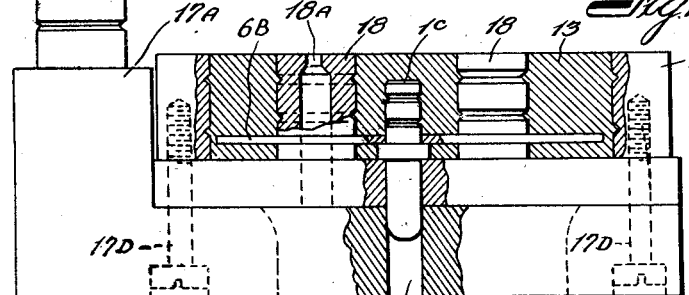
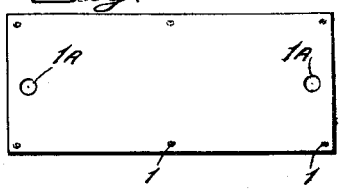
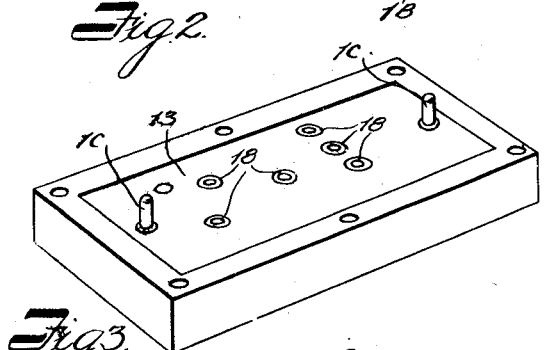
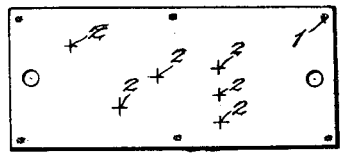
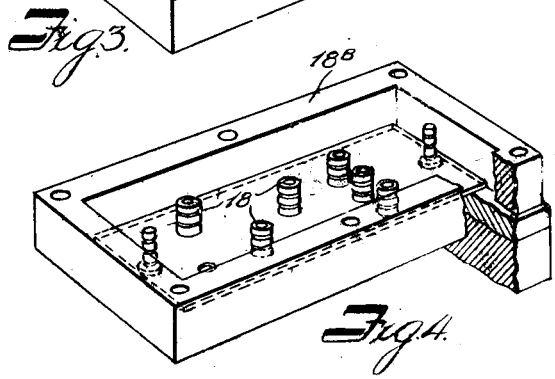
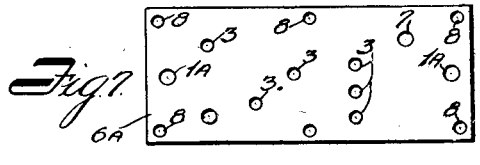
Inventor
Wesley Wilson Feb. 19, 1946.                W. WILSON                    2,395,082
            CONVERTIBLE MOUNTING MEANS FOR PUNCH AND DIE TOOLS
                    Filed Dec. 24, 1942          7 Sheets-Sheet 2
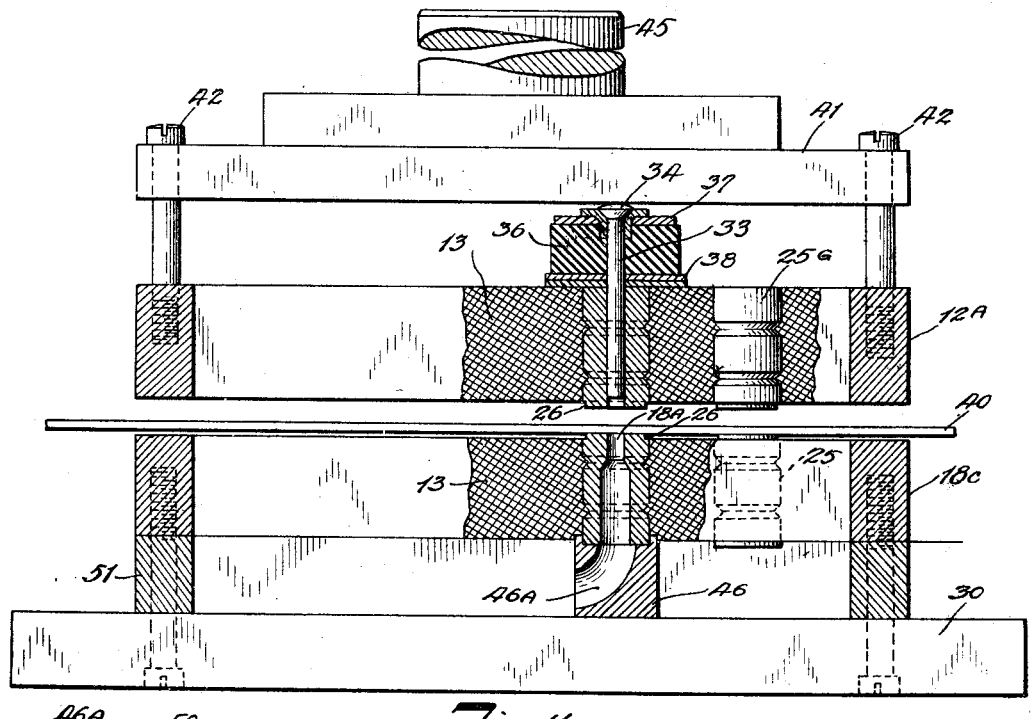
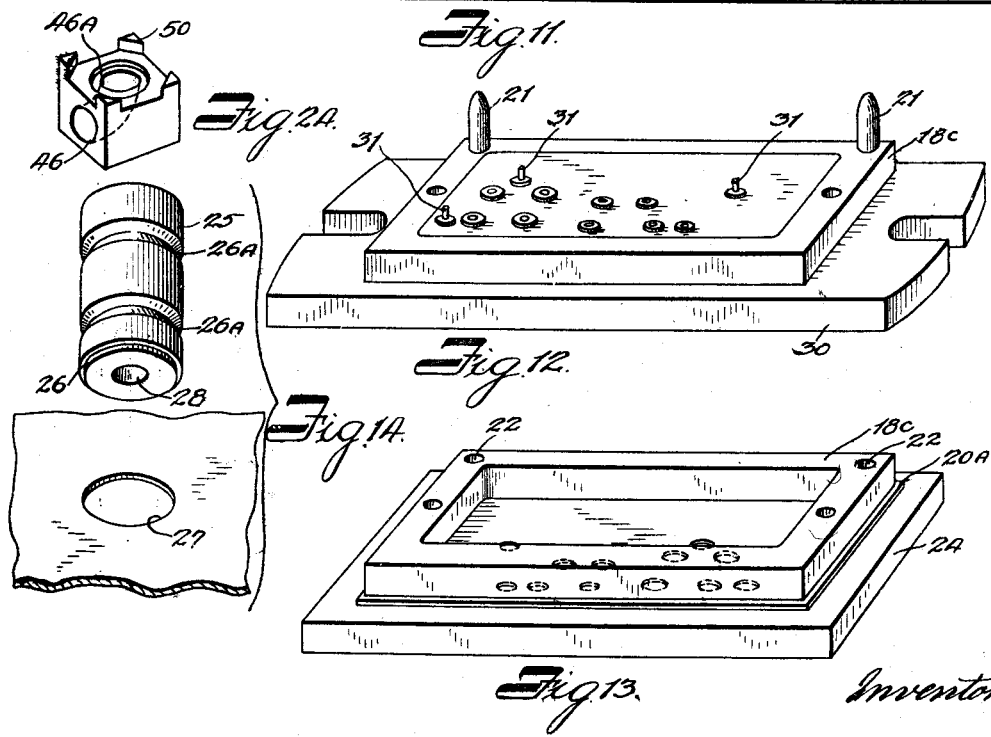
Inventor:
Wesley Wilson

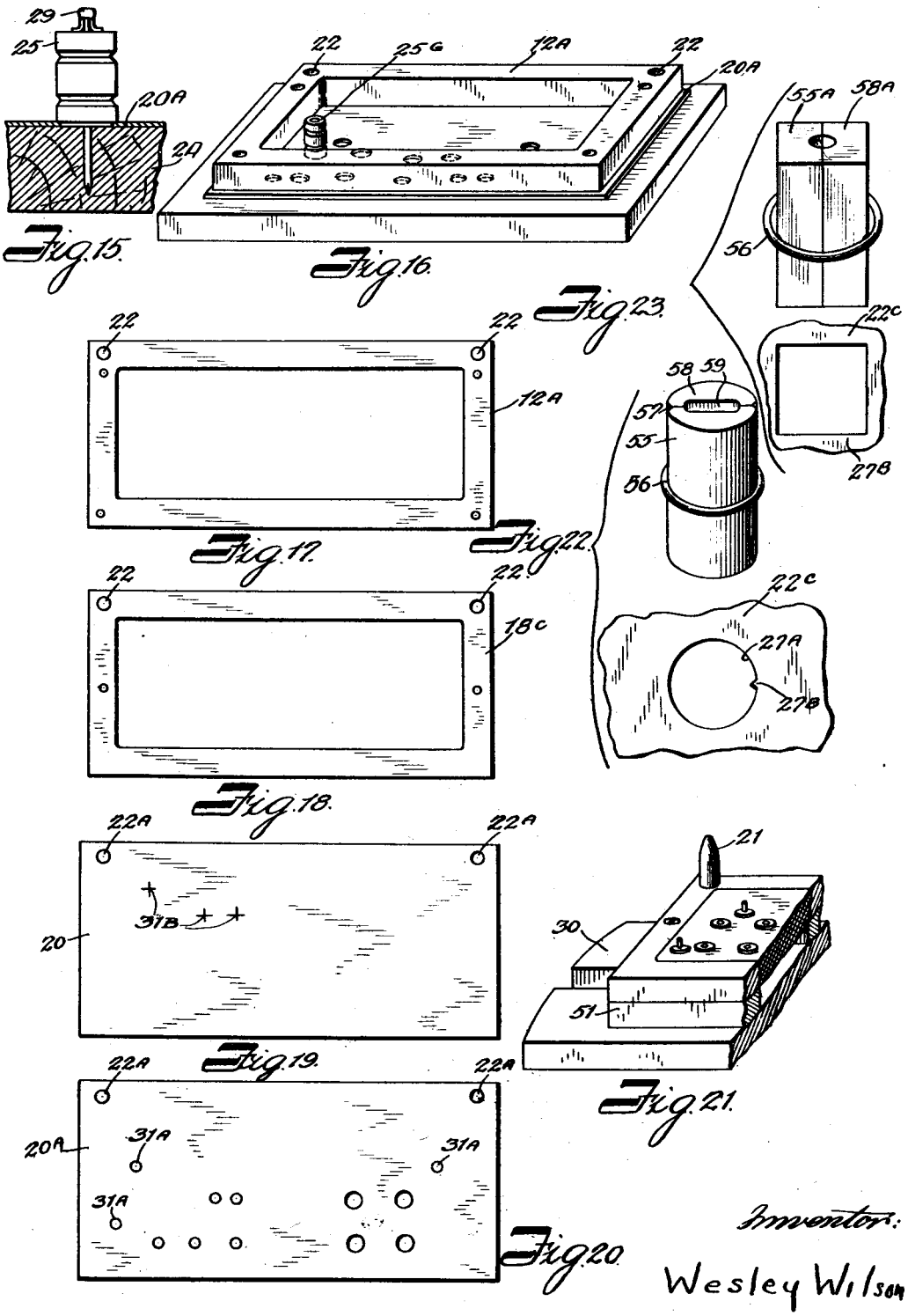

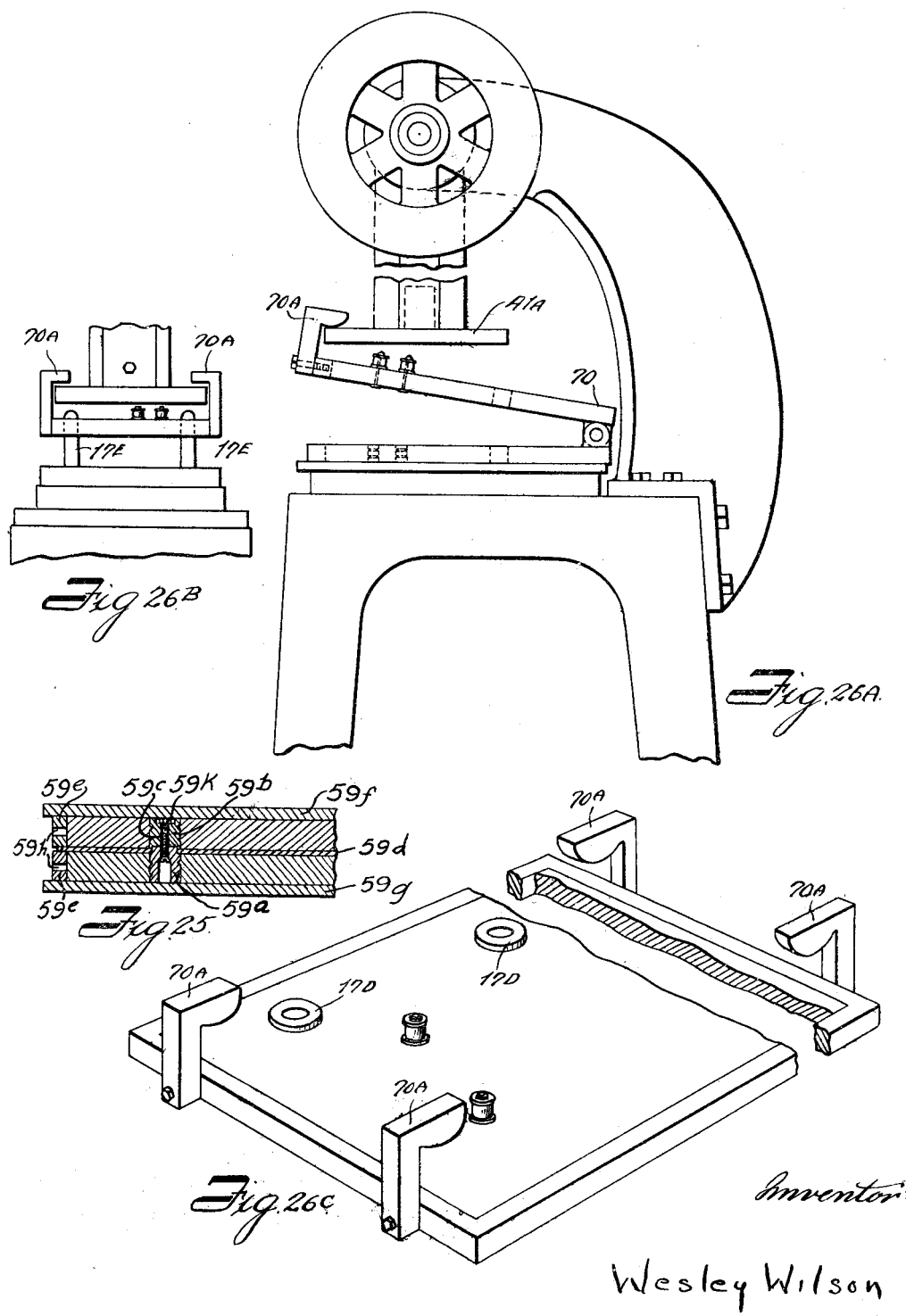

Feb. 19, 1946. W. WILSON 2,395,082
CONVERTIBLE MOUNTING MEANS FOR PUNCH AND DIE TOOLS
Filed Dec. 24, 1942 7 Sheets-Sheet 5
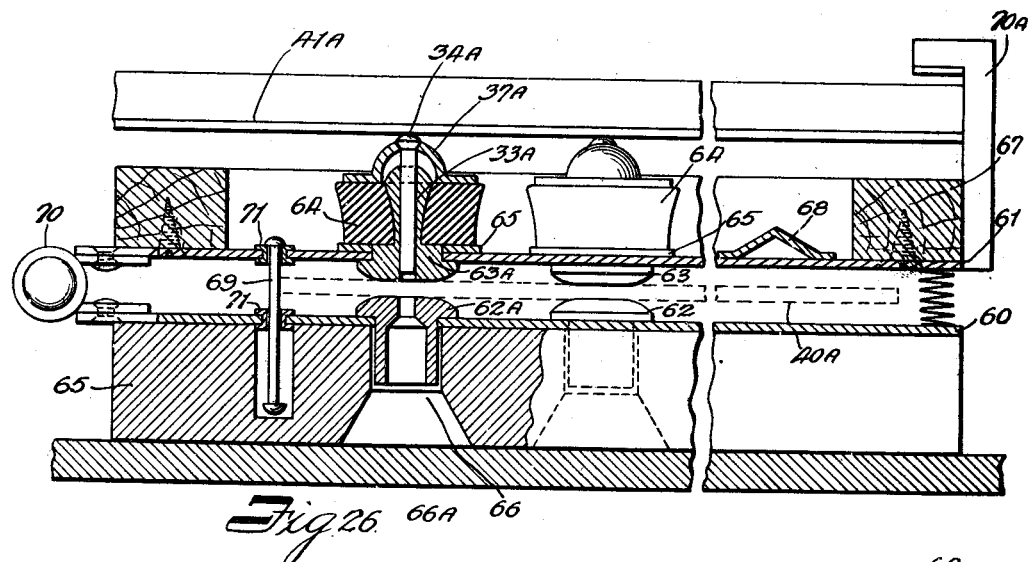
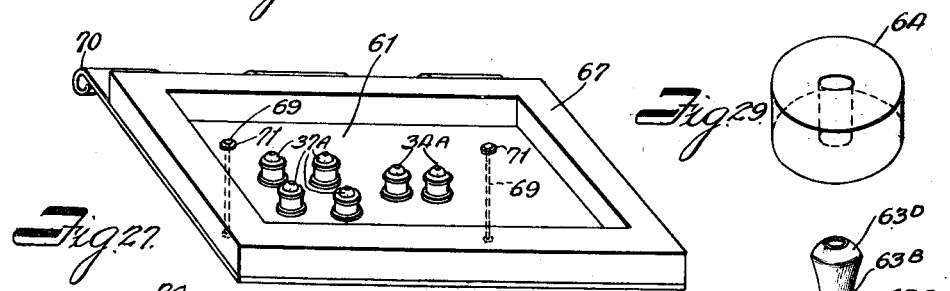
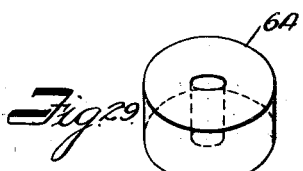
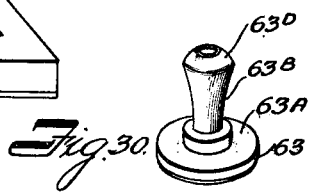
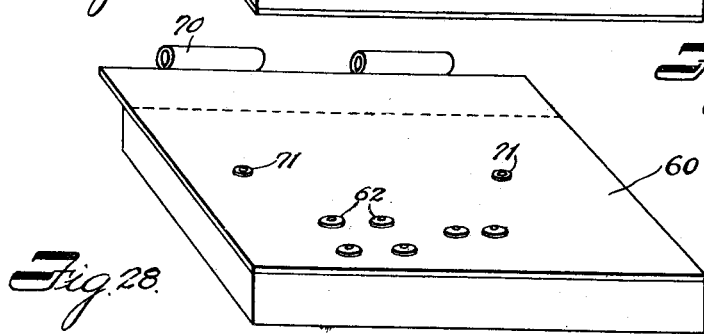
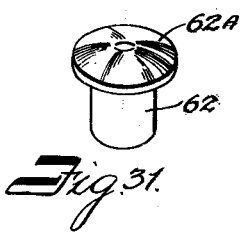
Inventor:
Wesley Wilson Wesley Wilson Feb. 19, 1946. W. WILSON 2,395,082
CONVERTIBLE MOUNTING MEANS FOR PUNCH AND DIE TOOLS
Filed Dec. 24, 1942 7 Sheets-Sheet 7

Inventor:
Wesley Wilson

Patented Feb. 19, 1946

2,395,082

UNITED STATES PATENT OFFICE 2,395,082

CONVERTIBLE MOUNTING MEANS FOR PUNCH AND DIE TOOLS

Wesley Wilson, Chicago, Ill.

Application December 24, 1942, Serial No. 470,004

30 Claims. (Cl. 164—118)

My invention relates to punch and die tools and means for mounting them and may be employed for perforating and forming various articles from sheet metal or other sheet materials and for other devices designed to operate upon metallic and other sheet materials.

While in certain figures of the drawings I have illustrated perforating punches and dies, I include under the general term of dies or metal working implements shearing devices, embossing devices, and most all other forms of devices employed in presses for operating upon sheet metal or other sheet material.

Metal working presses are usually employed with a head or ram and a bed or table and these are relatively movable and have the metal working implements attached thereto.

In the preferred form, the bed or table, or what may be termed the lower platen, is usually stationary, while the head or ram, or what may be termed the upper platen, is movable towards and away from the lower platen.

One of the objects of my invention is to provide an accurate means for maintaining proper relationship between the perforating punches and the dies in a multiple hole punching assembly.

Another object is to provide an adaptor device to make possible the use of a relatively small punch press for perforating or forming relatively large size sheets of metal which would ordinarily have to be punched on a much larger press.

Another object is to provide a die construction assembly to make it easy to quickly mount the die assembly in the punch press, and also easy to remove from the press.

Another object is to make it possible in a multiple die and punch assembly to change the position of one punch and die in relation to other punches and dies in the assemblies.

Another object is to provide a multiple punch and die construction in which low temperature moldable materials, such as Bakelite or type metal may be used to keep each individual punch and die in proper alignment.

Another object is to provide a large area die construction of unusually light weight construction.

Another object is to eliminate the expensive, custom-built machining practice now necessary when special multiple punch and die assemblies are constructed.

Another object is to use a templet for providing the proper alignment of a multiple of punches and dies in a multiple die assembly.

Another object is to provide a templet for maintaining, in a die construction, the proper relation of both punches and dies to the leader pins which are used for maintaining alignment between the punch and die assembly.

Another object is to provide a punch and die construction in which all of the component parts of said constructed assembly will be salvageable for use in a new die construction.

Another object is to provide a multiple hole perforating punch and die assembly in which various diameter holes can be perforated, in which accurate position is maintained by the use of a templet, in which only a few standard size holes are perforated therein, said standard holes to act as positioners when positioning the dies.

Another object is to provide a multiple number of duplicate templets all of which are made at the same time so as to make them as nearly identical as possible.

Another object is to provide a multiple punch and die construction in which one templet or one set of templets can be used to make a great number of dies.

Another object is to reduce the cost of multiple punch and die assemblies so as to make it economical to use such a construction on relatively small quantities of production, a condition found in the airplane industry today where in many cases rivet holes are being drilled by hand because of the high cost of designing dies for this work.

One of the primary objects of my punch and die invention is to make possible, in a perforating punch and die tool where a great number of holes are to be punched out at one time, to easily attain great accuracy in the alignment of the punches and dies and to eliminate a large amount of work ordinarily required due to the considerable difficulty encountered in the present methods of die construction when great accuracy of alignment is required. In other words, this invention discloses a far more simplified method of obtaining accurate alignment in die construction and eliminates the necessity of drilling through heavy pieces of metal, and further greatly simplifies the preliminary layout work involved.

My invention further consists of the novel features of construction and the arrangement of combinations of parts to be hereinafter disclosed and more particularly pointed out in the subjoined claims.

Sheets 1, 2, 3, 4, 5, 6, and 7 illustrate the various constructions and applications of the multiple die assembly.

Sheets 8–12, inclusive, show completely dissimilar inventions and, therefore, will be described separately from the material disclosed in the first seven sheets.

In the drawings:

Figure 1 is a partial cross-section view of a punch and punch holder assembly.

Fig. 2 is a partial cross-sectional view of a die and die shoe which is designed to be used with the punch assembly of Fig. 1.

Fig. 3 shows a perspective view of the die assembly removed from the die shoe.

Fig. 4 is another perspective view of the same die holder as shown in Fig. 3 but before the assembly has been completed.

Figs. 5, 6, 7, and 8 show various steps in the laying out and punching of die plates or templets which are used to obtain accurate location of punches and dies.

Figs. 9 and 10 are partial cross-sectional views of punches and dies used in the making of die plates illustrated in Figs. 5 to 8, inclusive.

Fig. 11 is a partial cross-sectional view of a somewhat different type of punch and die assembly in which the punches are more rigidly held in alignment with the dies than in the types illustrated in Figs. 1 and 2.

Fig. 12 is a perspective view of the die part of the assembly shown in Fig. 11.

Fig. 13 is a perspective view showing certain of the parts used in making the completed dies illustrated in Fig. 12.

Fig. 14 is a perspective view illustrating in greater detail an individual punch guide and a section of the templet used to locate the guide.

Fig. 15 is a partial view illustrating one method of holding individual dies when making a die assembly of the construction illustrated in Fig. 11.

Fig. 16 is a perspective view illustrating in detail a step in the procedure of assembling the punch guide holder assembly of Fig. 11.

Fig. 17 is a plan view of punch guide frame 12A of Fig. 11.

Fig. 18 is a plan view of the die holding frame 18C of Fig. 11.

Fig. 19 is a plan view of templet 20 showing the scribe lines which denote the centers of the perforating holes that will be punched by the final die assembly.

Fig. 20 is a plan view of the templet 20 of Fig. 19 after locating holes have been punched.

Fig. 21 is a partial perspective view of the die assembly and die shoe of Fig. 11.

Figs. 22 and 23 show two other possible types of individual die constructions and the type of hole which is required to pierce into the templet in order to procure proper alignment with these types of dies.

Fig. 24 is a perspective view of punch disposal device 46 which is sometimes referred to by toolmakers as a kicker, by which, in effect, the punchings are punched or kicked out of the way to one side.

Fig. 25 is a fragmentary sectional view of a die and punch guide assembly.

Fig. 26 is a partial cross-sectional elevation of another modification of the invention in which no thermal setting or thermal plastic material is used to lock the punching guide or the die in place.

Fig. 26A is a partial side elevational view of the die construction, similar to that of Fig. 26, assembled in a punch press.

Fig. 26B is a partial elevation of the modified construction of die assembled in a punch press.

Fig. 26C is a perspective view of a portion of the die illustrated in Fig. 26B.

Figs. 27, 28, 29, 30 and 31 are perspective views illustrating details of construction and some of the various parts used in building a die of a construction similar to that shown in Fig. 26.

Figure 32:
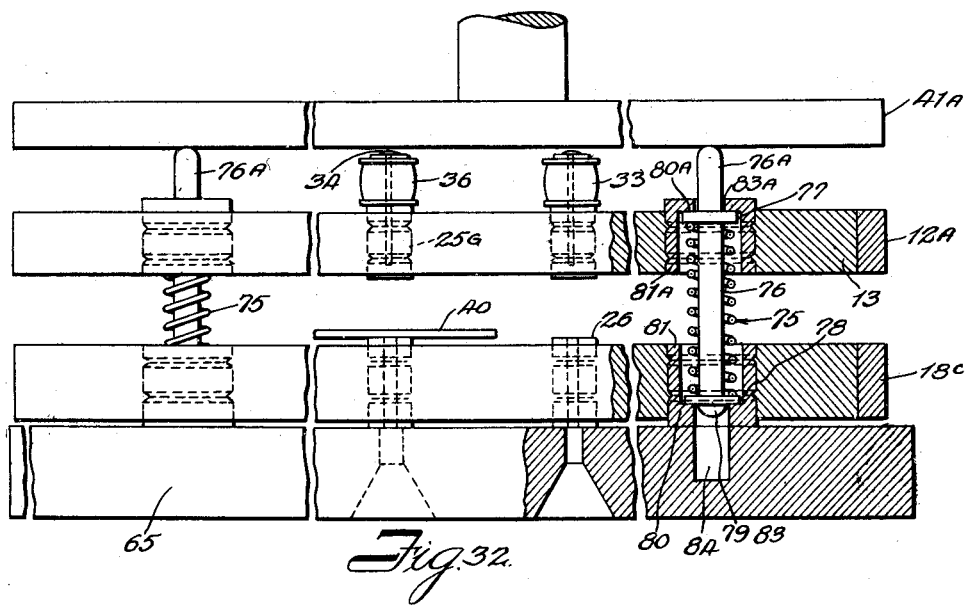

Fig. 32 is a partial cross-sectional view of still another modification of a multiple perforating die construction.

Figures 32A, 32B, 32C:
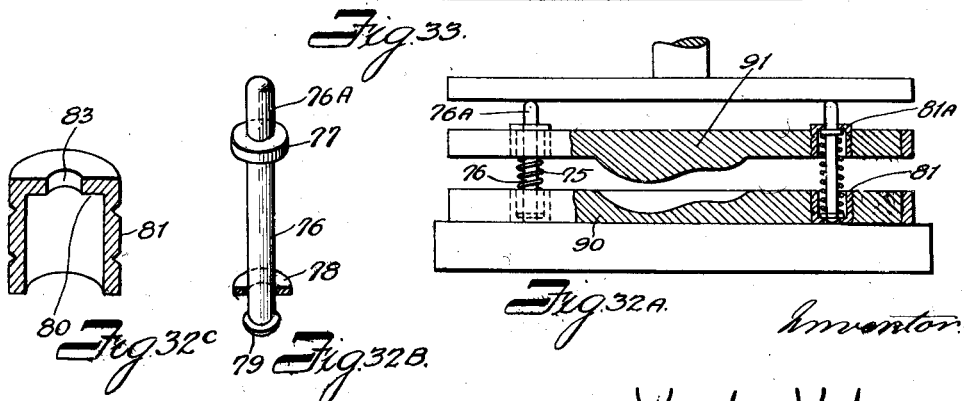

Fig. 32A is a partial cross-sectional side elevation of a forming die and punch assembly.

Figs. 32B and 32C are perspective views of certain parts used in the construction of Fig. 32.

Figure 33:
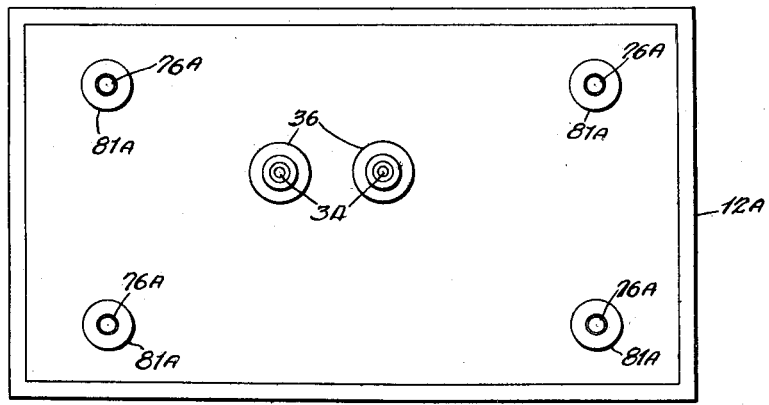

Fig. 33 is a plan view of the punch guide frame showing a step in the process of assembly.

Figure 34:
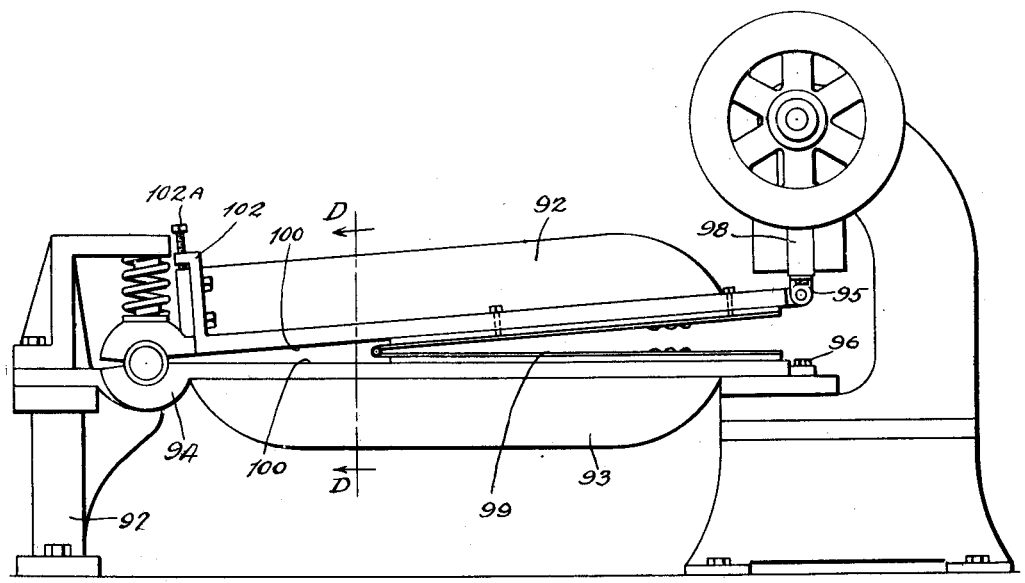

Fig. 34 shows an extremely simple method for punching large sheets of relatively thin material on a comparatively small size punch press.

Figure 35:
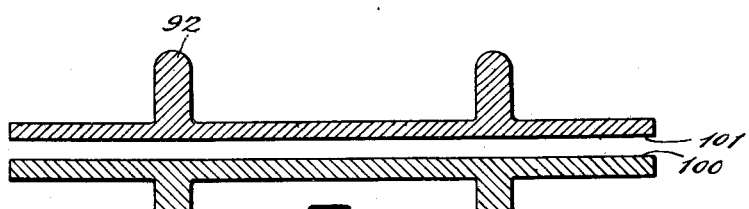

Fig. 35 illustrates a partial cross-sectional view of the upper and lower platens of Fig. 34.

Figure 36:
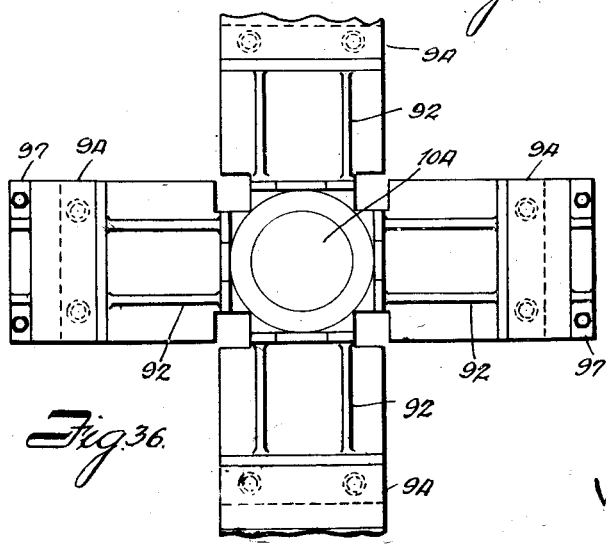

Fig. 36 illustrates how four pairs of hinged platens, of a construction similar to that illustrated in Fig. 34, can be located around a conventional type hydraulic press, the press being in the center and each pair of platens radiating out in various directions like the spokes of a wheel. In this construction four different dies can be operated at the same time, thus greatly increasing the effective capacity of the press.

Referring to the drawings in detail and considering the embodiment of my invention illustrated in Figures 1 to 10, inclusive, 11 designates the perforating punches which are usually attached to the movable ram of a press. 18 designates the individual die inserts which are in accurate alignment with punches 11 and are preferably rigidly fastened to the bed or lower platen of the press in such manner that when the ram of the press comes down, punches 11 travel downwardly until the reduced portion 11A passes a small distance in die holes 18A. By inserting a sheet of metal or other suitable material between punches 11 and die hole 18A, it will readily be seen that holes will be punched in said material when the press is operating.

One of the fundamental objects of this invention is to provide accurate alignment between punches 11 and die inserts 18. This is accomplished most easily by using suitable positioning templets.

Fig. 5 is a plan view showing two plates of metal which are in superimposed relation and which are preferably bound together around the edges by spot welds 1 or other means to prevent shifting. These superimposed sheets have pilot pin holes 1A located at each end and of an exact size and of an exact distance apart so as to accurately match pilot pin holes 1B in punch holder 17 and die shoe 17A.

Fig. 6 shows the same templet plates as Fig. 5 after it has been inscribed with layout lines which have been drawn in accordance with the spacing and relative relation of the various holes to be punched by the finished die assembly. The various points where the lines cross 2 are the center points of the various holes to be punched. This is a simple and standard method of layout commonly used in machine shop and drafting practice.

Fig. 7 shows how points 2 have been punched out to form holes 3 through the use of punch 4 illustrated cross-sectionally in Fig. 9. A small point 5 projecting concentric with the punch provides a simple means for obtaining accurate alignment with points 2 so as to insure accurate location of holes 3. Additional holes 7 can also be punched in the metal at convenient locations to allow the flow of a low melting point metal around the die plates, which is necessary as a later step in a die construction of this type. It should be clearly understood that the superimposed die plates which are still welded together have both been punched with substantially identical holes and in substantially identical relation to each other. This is assured by the fact that the two plates are rigidly attached together and the hole in one plate was punched out at the same time as the corresponding hole in the other plate. Thus, in a simple and very foolproof manner the relative location of the holes in both plates will be, to all practical purposes, identical.

The next step is to separate the two superimposed plates. This is easily accomplished by punching or drilling out the spot welds 1. This results in holes 8. As soon as holes 8 have been made, the two plates can be easily separated. One templet plate 6A can now be set aside and used as the top templet plate for positioning the punches. It is preferable to use the top of the two superimposed plates for this inasmuch as the punch holes 3 are slightly more true to the diameter of punch 4 in size on the top plate than on the bottom plate. Punches 11 are then inserted in holes 3 of this top plate 6A as shown in Fig. 1. It will be noted that the shank of the punches all have a diameter which is substantially the same size as the diameter of punch 4 and therefore punches 11 will fit holes 3 snugly.

The bottom portion of punches 11 is reduced in diameter at 11A. This reduction can vary depending upon the diameter of the holes to be punched by the completed die assembly. The bottom plate 6B, shown in Fig. 8, then has holes 3 enlarged through the use of punch 9 of Fig. 10 so as to obtain holes 3A. This diameter X of punch 9 is substantially the same diameter as the outside diameter of die inserts 18. Punch 9 of Fig. 10 has a concentrically located, tapered pilot 11 of an average diameter, the same as the diameter of punch 4 in Fig. 9. Thus in enlarging holes 3 to 3A, pilot 11 acts to keep the enlarged hole 3A concentric with the original hole 3.

The bottom die plate 6B as illustrated in Fig. 8 is now ready to be used for lining up the standard individual dies in forming the final die assembly.

Fig. 2 shows a cross-sectional view of this final die assembly. The die templet plate 6B is shown in its relation to dies 18 and held in position by matrix metal 13, frame or chase 18B providing the outside support and having holes tapped therein so it can be secured to the bed of the die shoe 17A by screws 17D. This die shoe 17A has leader pins 17B which act to accurately line up the punch holder frame 17 through bushings 17C. The punch holder 17 and die shoe 17A can be equipped with leader pins, which is common practice in tool and die construction. Hole 1B is drilled in punch holder 17 in accurate alignment with hole 1B in die shoe 17A. Guide pins 1C fit snugly in holes 1B. The shoulder on these pins acts as a stop to prevent the pins from being forced into holes 1B to too great a depth. At the other end of pins 1C concentric reduced diameter grooves are provided to permit matrix metal 13 to flow around these pins and thereby lock them rigidly in the matrix metal. The templets 6A and 6B are set on pins 1C before the matrix metal is poured, the pins passing through holes 1A. In view of the fact that holes 1A on the punch plate templet and holes 1A on the die plate templet are in identical relative position to holes 3A and holes 3 on the respective templet plates, it will readily be seen that this assembly will result in lining up punches 11 and dies 18 with a great degree of accuracy. The degree of this accuracy will of course depend upon the concentricity of die holes 18A and dies 18 and the concentricity of the reduced diameter 11A to the shank diameter of punches 11 and the accuracy of the alignment of holes 1B in punch holder 17 and holes 1B in die shoe 17A. As punches 11 and die 18 can be made in mass production on screw machines with great accuracy as to diameters and concentricity as well as the squareness of the ends, it will readily be obvious to a person experienced in tool and die construction that the resultant assembly can be made with great ease and great accuracy. The only great amount of care required is that the operator make sure, in pouring both the die assemblies, such as illustrated in Fig. 2, and punch assemblies, as illustrated in Fig. 1, that dies 18 and punches 11 must be held in close contact with surface A. This is to prevent tipping of the parts and also to insure that no matrix material will get between surfaces A on the back of the punch or the base of the die. There are many ways of accomplishing this, such as through the application of magnetism or clamps or weights. In fact, the use of a low melting temperature matrix material for holding tools and punches in a cavity is used today to a considerable extent by tool and die makers. The methods of pouring, preheating, etc., are fully understood by the people versed in the art.

Fig. 3 shows the die assembly removed from the die shoe 17A, preferably for storage purposes. Pins 1C, which are locked in the matrix material 13, will provide accurate positioning of the die assembly if at a future date it is to be reassembled for a punching operation.

Fig. 4 is an other view of the parts illustrated in Fig. 3, but before the matrix material has been poured in.

A modified embodiment of the invention is shown in Figs. 11 to 24, inclusive, in which it is required to use only one templet for obtaining accurate alignment of both punches and dies. This templet will be in construction quite similar to the die plate templet shown in Fig. 8 and is shown in Fig. 19 as templet blank 20A already laid out ready to be punched.

Supporting frames 12A and 18C (Figs. 17 and 18) are used to provide the support along the outer edges of the matrix metal in a manner similar to the construction shown in Sheet 1. These frames are, however, somewhat modified in design inasmuch as leader or guide pins 21 are provided to fit in holes 22 on frames 12A and 18C. When frame 12A is set on top of frame 18C, pins 21 can pass through the holes 22 of one frame to the other and provide the necessary accurate alignment.

Templet 20A in Fig. 20 has holes 22A of exactly the same diameter as pins 21 punched in the templet and the same distance apart. Therefore, holes 22A can be made to line up accurately with holes 22 of both frame 12A and frame 18C.

Fig. 13 shows templet 20A laid on a flat surface, preferably a metal plate 24, with frame 18C placed upon it so that holes 22 and holes 22A of the respective parts are in accurate alignment. This alignment can be maintained by having short pins in holes 22 engage holes 22A.

Fig. 20 shows the templet plate 20A of Fig. 19 after the punch and die locating holes 27 have been put in. The arrangement of these holes in relative position to one another is such as to make templet 20A suitable for use in making the construction of the die assembly shown in Fig. 11.

Frame 18C can be clamped down to plate 24 with the templet plate 20A between them in a number of places with standard toolmakers' clamps. The assembly then is ready for positioning the dies 25 (one of which is illustrated in Fig. 14) in the respective holes in the templet. A reduced portion 26 of the die 25 has a diameter the same as the templet die positioning hole 27. The accuracy of the diameter of this reduced portion 26 is important as it is desirable to obtain a snug fit with hole 27 while at the same time it should not have to be forced into the hole. Reduced portion 26 also must be truly concentric with die hole 18A. As stated previously, standard screw machines are available which will provide the required accuracy in producing part 25 and at the same time make possible quantity production at low cost.

Fig. 15 is a fragmentary view showing one method of holding dies 25 accurately in position on templet plate 20A in preparation for pouring the matrix metal. In this method preferably a composition plate 24 is used. The illustration shows 24 as constructed of wood. When die 25 is positioned in hole 27, a shouldered nail 29 is then inserted through the center of the die opening and driven into the wood base 24 to prevent any possible shifting of die 25 until such a time as the nail 29 is removed. By providing a shouldered construction to nail 29, it is apparent that it can be easily removed after the matrix material has hardened. After all of the dies 25 have been inserted in the respective holes on plate 20A and held in position through a suitable means, preferably by the methods used in Fig. 15, the matrix material is ready to pour. After the matrix has solidified, frame 18C is lifted off of templet 20A and assembled on a die shoe 30. This is illustrated in Fig. 12. It will be noted that the reduced portion 26 of dies 25 will project up above the surface of plate 18C in an amount equal to the thickness of templet plate 20A. This is clearly shown in Fig. 11. This projection above the surface of the matrix material is important as it makes possible the easy grinding of the dies without having to also remove some of the matrix material in the grinding operation. Leader pins 21 are inserted in holes 22, and pins 31 are dropped in the three outer dies, these outer dies having been located in the templet for the sole purpose of holding these pins, which will act as gauges in keeping the piece of metal to be punched, accurately positioned during the punching or perforating operation. This makes for an extremely simple and efficient method of locating gauges. All the toolmaker has to do when making a layout is to decide on the diameter of pin 31 and shift the center of the pin one-half of its diameter so that the pin will be tangent with the edge of the material it is gauging.

In Fig. 19 distance 31B, which is half the diameter intended to be used, is clearly shown laid out on the templet.

The fundamental steps for the construction of the die portion of the tool have thus been described.

Referring to Fig. 11, it will readily be seen that the upper or punch portion of the die has frame 12A which holds individual punch guides 25G in spaced relation in a manner substantially identical to the way frame 18C holds die 25. These punch guides 25G can be substantially identical in construction to dies 25. However, the preferred construction would be to provide a guide hole in guides 25G which would be a close fit with punches 33 so as to provide accurate guiding the entire length of the guide. The outward construction of guides 25G, however, can be identical to the dies 25. Thus, when positioning guides 25G in relation to frame 12A, the procedure can be identical to that used in the assembly of the dies 25, which has just been described. All that is necessary is that templet plate 20A be turned upside down when positioning punch guides 25G, so that the hole in each punch guide will line up with the die hole in each die after the assembly has been completed.

Fig. 16, which shows one punch guide 25G positioned on templet 20A, shows clearly that the templet has been reversed from the way it was used in Fig. 13. Leader pin holes 22 must be kept in as accurate alignment with holes 22A of the templet in making the punch guide assembly as was also necessary in making the die assembly. By using due care in the pouring of the matrix material, it is obvious that frame 12A can be placed on frame 18C and through the lining up action of the leader pins 21 each corresponding punch guide 25G will be in accurate alignment with each die 25.

Punches 33 are then ready to be assembled in the punch guides. Each punch 33 has an enlarged or head portion 34 which engages the washer-like member 37. The washer-like member rests on a piece of rubber 36. The desired number of spacing washers 38 is then placed under rubber 36 so that the bottom of the cutting edge of punch 33 will normally be pulled up and rest within the punch guide hole. The amount of power necessary to compress rubber 36 so as to push punch 33 down so it will project from the punch guide sufficiently far to perforate the metal will be regulated by the number of space washers 38. Sufficient washers can be inserted to provide sufficient pull-back by the rubber 36 to pull the punch back out of the material after the material has been perforated by the punch.

A sheet of material 40 is shown in relation to the punch and die in Fig. 11. It will readily be seen that when plate 31 moves downwardly, frame 12A will also move down with it until the punch guide rests on material 40. Screws 42, which pass through slip holes in plate 41 and screw into frames 12A, accomplish this. As soon as the punch guides 25G rest on the material 40, the frame 12A and punch guides 25G are unable to move downward further. Plate 41, however, continues downward a sufficient additional distance to cause punch 33 to compress rubber 36 and perforate material 40. This would normally be the bottom of the punch press stroke. Plate 41 would then move upward to complete the stroke, resulting in rubber 36 expanding so as to pull punch 33 back up into the punch guide, thus stripping the punch from material 40 which it has just perforated. Plate 41 by that time has moved up sufficiently to engage the heads of screws 42 and thus lift frame 12A and the entire assembly as a unit up and off of material 40. The distance of this movement would be dependent upon the length of the stroke of the press in which the die is being used. The neck portion 45 is provided on plate 41 for fastening into the ram of the press. It is apparent to a person versed in tool and die construction that punch guides 25G, when assembled in frame 12A, form a very accurate method of guiding the punches and greatly lessen the possibility of punches becoming bent, as the guides 25G act to guide punches 33 right down to the point where the punch starts to perforate material 40. It is readily apparent that great accuracy and great sturdiness of construction is obtained with this new type of design. It will also be noted that frame 12A is made a little higher than punch guides 25G. As shown in Fig. 11, the top of frame 12A is about in line with the top of washers 38 and the object of this is that it makes possible accurate lubrication of the punches in the punch guides by placing a few teaspoonfuls of oil around washers 38. The up-and-down motion of the punches will cause a thin film of oil to flow in and around washers 38 and down around the punches so as to result in lubricating each punch at the point where it perforates the metal. This lubrication at the point of punching is very important when perforating certain types of material. It results in longer life of the punch and die, and by increasing or reducing the viscosity of the oil used for this lubrication the amount of oil which will flow down and around punches 33 can be easily regulated so that a sufficient amount for providing the proper lubrication at the point of perforation will be obtained while at the same time excessive lubrication can be avoided. This will make possible in many cases the avoidance of the necessity of cleaning the great quantities of excessive oil off the perforated material (which is common in present day punching practice), in order to make it suitable for handling in the successive stages of manufacture. This freedom of excessive lubrication will make it possible to increase the speed of production and handling and make for more pleasant working conditions for the operator of the punch press, all of which are important requirements in tool and die construction. The blanks or punchings which have been punched by punches 33 will pass through holes 18A in dies 25. After a number of sheets 40 have been perforated, it is obvious that means must be provided for disposing of these blanks. One method is to provide a kicker 46, which is illustrated in Fig. 11, which will cause these blanks to flow out horizontally to one side along the channel 46A, while at the same time kicker 46 provides strong support for die 25 during the punching operation. Kicker 46 is illustrated in detail in Fig. 24.

In Fig. 24 it is seen that projections 50 will engage with the bottom portion of the die at four points so as to prevent side slippage. These kickers 46 can be assembled underneath the die assembly after the matrix material is poured. The preferred construction is to use a sufficiently small quantity of matrix material so that it will not interfere with the projections 50 on the kicker. When using kickers for disposing of the blanks, it is advisable to use spacers 51 under the frame 18C so that the screws which lock frame 18C to the die shoe 30 can be pulled up tight without placing a strain on the matrix material. This is also illustrated in the cut-away view of Fig. 21.

While the type of die construction illustrated in Sheets 2 and 3 which I have so far described is for perforating round holes, it must be understood that irregularly shaped holes can be punched equally well. Fig. 22 shows one form of die which would be suitable for perforating irregularly shaped holes. One method of construction of this type of die is to make it in two pieces. These pieces would consist of two half round strips of metal 55 and 58, in which a portion of the irregularly shaped hole for blanking 59 is cut out of each half. These two parts can be held in the assembled portion and a groove cut around the outer surface so that a spring retaining ring 56 can be snapped in place so that the two halves 55 and 58 will be held in proper relation to each other while the die is being assembled. Dies of this construction can be most effectively used in combination with an expanding matrix material such as type metal which, upon cooling, crystallizes and expands. This will result in considerable pressure being brought to bear on parts 55 and 58 and thus hold them firmly together. Retaining ring 56 will engage the matrix material and prevent the assembly from shifting up or down, much in the same manner as grooves 26A of Fig. 14. Before assembling parts 55 and 58, corners can be beveled so as to provide a positioning means with a notch 21B of the templet positioning holes 21A. It is readily apparent that the positioning guides of a type similar to 25G can also be made of identical construction with the exception that the hole 59 will not be relieved or enlarged a portion of its length as is customary in the die construction to allow the perforated blanks to pass through more freely. Considering parts 55 and 58 either as a punch guide or as a die, it immediately becomes apparent that slot 57, which engages projection 27B on the templet will thus assure accurate alignment of both punch guides and dies in the final assembly. Actually, it is proposed in constructing dies and punch guides of the type shown in Fig. 22 to cut many of the irregularly shaped holes on either a milling machine in which the cutter has been ground so as to mill the exact contour required in the hole 59. Thus, if a square hole is desired, parts 55 and 58 could be cut with a V milling cutter, and the size of the square hole will be determined by the depth of the V groove which the milling cutter cuts.

Fig. 23 shows another possible construction using rectangular rather than half-round pieces of metal. In this application, it would be necessary to punch a square or rectangular hole 27B which would act to position the assembly consisting of 55A and 58A and retaining ring 56.

In the manufacture of airplanes it is very often necessary to change the position of the rivet holes as a result of some slight change or modification in the airplane construction. These changes are usually unpredictable in advance. Because of this, the airplane manufacturers in most cases drill each hole separately rather than to attempt to make blanking dies. While it is possible with the die construction so far described in this application with reasonable ease to reconstruct a new die from the old parts without waste or losses of material, it does of necessity still require the expenditure of an appreciable amount of time. On a large die, where only one or two holes are to be moved, the entire rebuilding of the die to accomplish this is relatively expensive. To overcome this difficulty, especially on large dies having many holes, it will be possible with my type of dies illustrated in Figs. 11 to 23, to change the position of one or two holes most economically by withdrawing the punches from the punch guides of the holes which require changing. After the material has been punched, the new holes can be drilled by hand in the new position requiring the use of only a very small templet sufficient only in size to cover two or three nearby holes. These nearby holes can be used for the gauging of the templet while the new holes are being drilled. Thus, in the case of a panel sheet having a thousand or more holes, it will readily be seen that in many cases it would be more economical in the event that five of these holes had to have their positions changed in relation to the 995 other holes, to merely withdraw the punches and drill the five new holes by hand than it would be to rebuild the die in order to correct the position of the five holes.

Actually, a great many dies of the construction just described can be used economically in the airplane industry. They will start with a large number of holes, punching in most cases all the various size holes required in the sheet, and later, it may be necessary to withdraw a number of punches due to a change in construction as just described. Later, additional changes will probably be made so that certain additional holes will no longer be wanted. Therefore, additional punches will be withdrawn until such time as possibly five or ten percent of the original holes will have become obsolete, and in most cases approximately that many corresponding new holes will be drilled by hand with a templet. Eventually, there may come a time with many dies where it will be found economical to rebuild the die completely and incorporate in the new die all of the changes in design which have been put through subsequent to the construction of the original die. The new die will again eliminate the drilling of any holes until additional changes in the design make it necessary to start to withdraw certain punches again.

It should be noted that the ease of withdrawing punches so that certain holes which are no longer required can be left out of the punching operation, is an important feature of this invention and considering it in conjunction with the flexibility and ease of constructing and the complete salvaging of all parts when the die becomes completely obsolete, makes it obviously outstanding in importance.

Fig. 25 shows an assembly which enables the pouring of the molten matrix material, both for the die members and the punch members. The construction shown comprises a die member 59a and a punch guide sleeve 59b, a screw 59c inserted through the registering openings in the die sleeve and the punch guide sleeve for securing the parts together, with their working faces in engagement, a portion of a templet 59d having an opening into which the reduced cylindrical extension of the die sleeve extends for holding the pairs of sleeves in proper position with respect to each other, and an enclosure forming a flask into which the molten material is poured to be solidified about the sleeve assemblies. This enclosure comprises, in effect, a two-part flask including the lower half which, together with the templet 59d, confines the molten material surrounding the die sleeves 59a and an upper half which, together with the templet, encloses the matrix material which surrounds the punch guide sleeves 59b. Each of these half flasks is provided with side enclosure members 59e which engage the templet to form a tight joint and which, together with the plates 59f and 59g, form the flask. After the molten material has been poured in through the opening 59h to fill the enclosures in the flask, the two half flasks may be separated and the lower side of the lower flask may be removed. The connecting screw may then be unscrewed from the nut 59k to enable the upper and lower matrixes, with the sleeves 59a and 59b embedded therein, to be separated and to enable the templet to be removed from the lower matrix.

Referring to Sheet 4, Figs. 26 to 31, inclusive, show a still further modification of the invention, which is also well suited to the airplane industry and many other industries where unusually small quantities or pieces are to be perforated and unusually frequent changes in the relative position of holes are anticipated.

Fig. 26 shows a partial cross-sectional view of a punch and die assembly. It will be noted that this construction eliminates the necessity of a matrix material for holding the dies and punch guides in their proper positional relationship. Positioning of the punch guides and the respective dies is maintained through the use of plates or sheets 60 and 61, preferably of metal. These sheets have holes punched or drilled in them on centers corresponding to the centers of the holes which will be subsequently punched by the completed die. Plates 60 and 61 are fastened together at one side by a hinge 70 which is of sufficiently accurate construction to maintain accurate alignment between the punches and the corresponding die. The general method of laying out these holes can be similar to the method described earlier in the specification and illustrated in Figs. 5, 6, and 7. The plates 60 and 61 will generally, however, be made of heavier material than the templet plates illustrated in Figs. 5, 6, and 7, and, consequently, it will often be desirable to drill the holes rather than to punch them. The two plates 60 and 61 can be held together in any convenient manner such as spot welding at the corners, and the holes can be drilled or punched through both plates at the same time. This will insure accurate alignment between the punch guides 63 and the dies 62, both of which should be of such a size as to provide a close or snug fit with the hole in the plate. Die 62 has a shoulder 62A which acts as a stop and allows the die to be pressed only a predetermined distance into the plate, and punch guide 63 has a shoulder 63A which likewise acts as a stop. As the die assembly usually rests on the bed of the press, with the punch guides and punches mounted above, die 62 will, in most cases, remain in plate 60 through the action of gravity and friction, and thus will require no additional locating means. Punch guide 63 will, however, require additional locating means in order to prevent the action of gravity causing it to work out of plate 61. This is most easily accomplished by providing a reduced diameter 63B on the punch guide and preferably of tapered construction as illustrated, which will engage the rubber stripper 64. Fig. 29 illustrates in detail rubber stripper 64. It will be noted it has a hole of smaller diameter than the smallest portion 63B of punch guide 63. Thus, when stripper 64 is forced down on the shank of punch guide 63, the tension of the rubber will act to hold punch guide 63 in plate 61 at all times. At the extreme top of punch guide 63, 63D is crowned or pointed so as to facilitate the pressing of the rubber stripper onto the punch guide.

In Fig. 26, a washer 65 is shown assembled between plate 61 and stripper 64. This washer will be required in cases where plate 61 is of rather light material and where a rather large diameter rubber stripper 64 is required in order to provide sufficient stripping action as in the case, particularly, of large diameter punches. If plate 61 is reasonably heavy in proportion to the ultimate thickness of the material being perforated by the finished die assembly and rubber stripper 64 is not of excessively large diameter, washer 65 will not be necessary.

In Fig. 26, one of the punch guides is illustrated in cross section and exposes to view punch 33A. It will be noted that punch 33A of Fig. 26 is much shorter than the punch 33 of Fig. 11. This is due to the fact that the rubber stripper fits down and around a substantial portion of the punch guide in Fig. 26, whereas in Fig. 11 the rubber stripper fits on top of the punch guide. Thus, the construction illustrated in Fig. 26 in which a shorter punching is required, has the advantage in that the tendency of the punch bending is greatly reduced as only a portion of it sticks out of the punch guide, and this is the only portion which can possibly bend. A crowned washer 31A engages the flared head of punch 33A and the upper surface of the rubber stripper 64. Thus, when pressure is applied to the flared head of punch 33A, crown washer 37A will compress rubber 64 and store up sufficient energy to withdraw punch 33A from the material 40A illustrated in dotted lines. A supporting base member or shoe 65 of Fig. 26 which can be made of wood, masonite, or metal, is provided for supporting die 62 at the shoulder 62A through plate 60. It also acts to keep plate 60 from bending or flexing, which would affect the punch guide and die alignment. Below each die a flared cavity 66 can be cut or drilled in shoe 65 to provide storage space for the die punchings 66A. Where the quantity of pieces to be perforated at any one time is not too great, it will be practical to let the punchings collect in storage space 66, the punchings being removed when the die assembly is withdrawn from the punch press. It will be readily apparent that by increasing the thickness of die shoe 65, an increased amount of storage space 66 will be available. On large dies where holes are punched over a great area of surface, disposal of punchings becomes quite a problem and, therefore, the storage space 66 of Fig. 26, in combination with the various means illustrated in this application, for simplicity of inserting and removing the punch and die assemblies from the punch press, is an important feature of the invention.

In order to prevent plate 61 from flexing during the punching operations, strips of wood or masonite 67 can be provided at the outer edges and attached in a suitable manner to plate 61. 68 shows a metal angle construction which can be spot welded to plate 61 as an alternate means of increasing the rigidity of plate 61.

In order to locate material 40A accurately at the time of its perforation, Fig. 26 illustrates a shouldered or headed pin which passes through accurately located holes in plates 60 and 61. In order to prevent excessive wear, a bushing 71 is inserted in plate 60 and a similar bushing, also 71, is inserted in plate 61. Bushings 71 can be accurate screw machine parts, which will form a snug fit with the holes in plates 60 and 61 and have a projecting portion which can be swedged over and cause them to be locked permanently in position, the holes in the center of bushings 71 being concentric and of just sufficient looseness to permit pins 69 to slide freely without appreciable side play. Thus, by using three or four of these pins, accurate gauging of the material being perforated can be easily obtained.

While plates 60 and 61 can be held in accurate alignment through the use of leader pins 21, such as illustrated in Fig. 12, or leader pins 17B, as shown in Fig. 2, Fig. 26 illustrates an alternative construction. Instead of leader pins, a hinge 70 is provided which fastens directly to plates 60 and 61. When using a hinge type construction, such as this, it is important that when material 40A is in a position to be perforated, plates 60 and 61 are parallel at the moment that punch guides 63 and dies 62 are in contact with the material to be perforated. This is the position as illustrated in Fig. 26 of these various parts.

Fig. 26A is a side elevation of the punch press in which a die construction of the type illustrated in Fig. 26 is shown. The operation of lift hook 70A is shown in Fig. 26 in contact engagement with plate 41A so as to lift the punch assemblies upward away from the die assemblies when the ram is at the top of the stroke.

Fig. 26B shows still another modification in which lift hooks 70A are used on two sides of the punch holder frame so that the entire punch holder frame will be lifted up and away from the die holder frame assembly.

Fig. 26C is a perspective view of the punch holder frame assembly of Fig. 26B. One of the easiest ways to maintain proper punch and die alignment when using lift hooks in the manner illustrated in Fig. 26B and Fig. 26C is to provide guide or leader pins similar to the leader pin 17B of Fig. 2 or leader pins 21 of Fig. 12.

In Fig. 26C, guide bushings 17D are shown locked into the matrix holding material and have a hole diameter which will provide a close sliding fit with pin 17E.

In Fig. 26A, hinge 70, which provides accurate alignment between punch and die assemblies, eliminates the need for leader pins and makes it necessary to have lift hooks only at one side of the die frame. Another advantage of this type of construction is that the die frame opens up wider at the point where the lift hook engages plate 41A, thus making it easy to insert and remove sheets which are to be perforated. It will be readily discernible to a person experienced in punch die press construction and operation how easily a die assembly of the type illustrated in Fig. 26A could be inserted and withdrawn from a press. In fact, a design of this type is unusually foolproof and simple, and in cases where only a small number of parts are to be perforated at one time, it would not even be necessary to permanently fasten the die down to the bed of the press. Thus, lift hook 70A of Figs. 26A, 26B, and 26C, and pin 76 in Figs. 32, 32A and 32B, are both designed with the object of speedy punch press setting up and removal and, therefore, as previously explained, have wide applications to the airplane as well as other defense industries.

Fig. 27 is a perspective view of the upper half of the punch and die assembly illustrated in Fig. 26, the pin of hinge 70 having been removed.

Fig. 28 is a perspective view illustrating the lower portion of the die assembly illustrated in Fig. 26. It shows plate 60 with the various die bushings 62 and gauge bushings 71 in position. Various other parts are identified by corresponding numbers for the same parts illustrated in Fig. 26.

In sheet 6, Fig. 32 illustrates a partial cross-sectional view of a perforating punch and die assembly of a type in which the punches and dies and associated parts, such as strippers, punch guides, etc., are similar in construction to those of Fig. 11. The fundamental difference in construction between Fig. 32 and Fig. 11 is that in Fig. 11 screws 42, which are attached through punch holder neck 45 to the ram of the press, cause the punch frame 12A and the parts assembled within this frame to move up with the ram of the press so that the material to be perforated can be inserted and, after punching, be removed. In Fig. 32 a plate 41A moves up and down with the ram of the press, but has no means of attachment to frame 12A, so as to pull it up. Instead, frame 12A and the assembled parts within this frame are lifted up through the expansion of springs 75, each of which rides on a pin 76, one end of which presses against a washer 78 and the other end of which presses against enlarged shouldered portion 77 of pin 76. Above the shouldered portion 77 is a reduced diameter portion 76A of pin 76. The bottom end of pin 76 has a head portion 79 which acts as a stop for washer 78. The normal uncompressed form of spring 75 would be such that its overall length would be greater than the overall length of the portion of pin 76 between enlarged portion 77 and washer 78. Thus, the enlarged portion 77 and the head portion 79 of pin 76 which acts as a stop for washer 78 normally keeps spring 75 under tension, and this tension will hold washer 78 firmly against head portion 79. The outer edge of washer 78 rests on shouldered portion 80 of screw machine part 81, which is locked in molding matrix of the die holder assembly frame 18C. The expanded portion 77 of pin 76 engages shoulder 80A of an identical screw machine part 81A which is similar to 81, which is locked in molding matrix of the punch holder frame 12A. In order to insure proper engagement of the punch and die means, leader pins and leader pin openings such as shown at 21 and 22 in Figs. 12 and 13 may be used.

Fig. 33 is a plan view looking down upon frame 12A with plate 41A removed and shows how screw machine parts 81A are placed in the matrix material, preferably near the four corners, and so that the springs 75 will not interfere with the insertion of material 40 during the normal operation of the die. While only two punches are shown installed in this particular die construction, there is sufficient space to permit many more. In fact, screw machine parts 81A could be moved over into each inside corner of frame 12A which would allow for considerably more die space. These two screw machine parts 81 and 81A are accurately located in positional relation with the punch guides and the frame 12A and the dies of frame 18C so that when punch guides 25G and dies 26 are in correct alignment, the upper part 81A will be in accurate alignment with part 81. Hole 83A in screw machine part 81A permits reduced portion 76A of pin 76 to pass through and project upward, while a like hole 83 in the lower screw machine part makes room for head portion 79 of pin 76 and, upon compression of spring 75, permits head portion to pass downwardly through hole 83 and allows pin 76 to move downwardly through washer 78. The upper portion 76A of pin 76 extends to a point slightly higher than the head portion 34 of the various punches. It will be seen that springs of sufficient strength will cause frame 12A and the various punch assemblies assembled therein to be held up and away from 18C through the expanding pressure of spring 75, which causes shoulder 77 of pin 76 to press against shoulder 83A of screw machine part 81A which is molded in frame 12A, and when plate 41A moves down, shoulder 83A, which rests on expanded portion 77, will also move down by the action of gravity and will continue to move down until punch guides 25G rest on material 40, which, in turn, rests on dies 26. As soon as this occurs, frame 12A with punch guides 25G can no longer move downward and as 41A continues to move downward, shoulder 77 breaks contact with projection 83A. The head portion 34 of punches 33 are by this time in contact with plate 41A, and as the plate continues to move down, rubber stripper 36 becomes compressed and punch 33 perforates material 40. By properly adjusting the stroke of the punch press, plate 41A can be made to move down a distance sufficient to just perforate material 40 by punches 33. As soon as this occurs, plate 40 will start to move upward. As plate 41 moves upward, pin 76 will also move upward until shoulder 77 again engages projection 83A which will then cause frame 12A and various punch assemblies mounted therein also to move upward until head 79 comes in contact with washer 78 which limits the expansion of spring 75. Material 40 may then be removed from the punch and die assembly and a new piece of material may be inserted.

From the description thus far, it is obvious that frame 12A falls by the action of gravity until punch guides 25G rest on material 40 and none of the tension of spring 75 is exerted against the matrix material which holds punch guides 25G in frame 12A. By having projection 76A slightly higher than the head portion 34 of punches 33, it is obvious that in the event of high speed operation of the press in which the speed of the ram would be greater than the acceleration due to the action of gravity of frame 12A and the parts assembled therein, plate 41A would then contact the head portion 34 of punches 33. The effect of this contact will, however, be absorbed by rubber strippers 36 so as to prevent undue stress on matrix material 13.

From the foregoing description, it is evident that the spring means 75 for opening a die assembly as illustrated in Fig. 32 makes for greater ease in inserting and withdrawing the die assembly from the punch press. In fact, plate 41A can be more or less permanently attached to the punch press and various dies having a spring operating construction as illustrated in Fig. 32 can be inserted and materials perforated without having to rigidly fasten the die assembly to the press. Thus, for small runs where 25 to 200 parts are required to be perforated, considerable time can be saved by a spring opening die construction of this type.

Fig. 32A is a partial cross-sectional side elevation of a forming die having the same type of spring opening die construction as that illustrated in Fig. 32. The main difference is that the construction in Fig. 32 is for perforating flat sheets, whereas the construction in Fig. 32A is for drawing, forming, or embossing flat sheets of material. The various parts, such as spring 75, pins 76, and screw machine parts 81 and 81A shown in Figs. 32A can be of identical construction as the parts of like number in Fig. 32. Therefore, the previous description of the parts and the operation of these parts in a punch press which covered Figs. 32, 32B and 32C can also be referred to in order to readily understand the operation of the forming die illustrated in Fig. 32A.

Fig. 34 is a side elevation of a hinged extending device which will permit the perforating or embossing of large size relatively thin sheets of material in a comparatively small punch press, which device will henceforth be referred to as a punch press enlarger and, as illustrated in Fig. 34, is suitable for use with various types of presses having rams which permit up-and-down adjustment as to position of the stroke. It is to be understood, however, that various modifications of this punch press capacity enlarger can be made to make it suitable for use on a press of nonadjustable ram construction. All the adjustments can then be incorporated in the capacity enlarger. This punch press capacity enlarging device consists of an upper platen 92 and a lower platen 93. The two platens are held in pivotal relationship to each other by a hinge device 94 which is located at one end of the platens while the other end of the platens is attached to the press. The upper platen 92 is attached to the ram of the press through a link 95, while the lower platen 93 is fastened to the bed of the press preferably by bolts 96 which rigidly support this end of the lower platen. The stand 97 supports the other end of platens 92 and 93. In Fig. 34 the ram of the press 98 is at the top of its stroke or in the open position and through link 95 it holds upper platen 92 up and away from lower platen 93. The amount of opening between platens 92 and 93 varies directly with the distance from the hinge 94.

The punch and die assembly 99 is shown located between platens 92 and 93 and can be of a type similar to that illustrated in Fig. 32, the lower portion of the die resting on surface 100 while the top portions of pin 76A is in position to make contact with surface 101 of the upper platen 92. When the press is operated, ram 98 will move downward and cause upper platen 92 to move downward, pivoting on hinge 94. Surface 101 of platen 92 will engage pins 76A causing them to move downward, and eventually surface 101 will contact the enlarged head portion 34 of punches 33. In other words, platen 92 will act in the same manner on pin 76A and punches 33 as plate 41A of Fig. 32 acts.

When the punch press 98 is at the bottom of the stroke, surface 101 of plate 92 should for most practical purposes be parallel to surface 100 of plate 93, and the distance between surfaces 101 and 100 should be just sufficient to cause punches 33 to enter the die holes of die 25 so as to insure that the material be perforated by the punches. Platen 92 is adjustable through adjustable connection 102 which is located near hinge 94, which, in combination with the adjustment built into the ram of the punch press, makes it possible to accurately adjust the space between surfaces 100 and 101 and thus obtain the most satisfactory results and provide a varying degree of adjustment where dies of different sizes are to be used.

Fig. 35 is a partial cross-sectional view of platens 92 and 93 through D—D.

Fig. 36 is a plan view showing how a plurality of punch press capacity enlarging devices of a type illustrated in Fig. 34 could be used in conjunction with a four-post hydraulic type of press. The press 104 is shown schematically in the center, and various upper platens 92 are shown sticking out like the spokes of a wheel from the press, hinges 94 and stands 97 being at points farthest away from the press proper. Thus, punch press capacity enlargers of the type illustrated in Fig. 34 could be used, when properly designed, in multiple, around large presses, so that, with each stroke of the press, a multiple number of dies could be operated.

I have found that when certain kinds of matrix material are used and the material has cooled down to near the congealing point, it becomes stagnant and sluggish, somewhat like wet sand, and does not flow freely into the crevices of the material to be embedded. This difficulty may be overcome to a considerable extent by subjecting the matrix material to high frequency vibrations, as by setting the mold on a table which may be set in vibration by a 60-cycle hummer or by applying a high frequency hammer-like vibrator to those parts of the matrix material adjacent the crevices.

In the claims where the word "hardened" is used in describing the punch or die elements, it is to be understood as covering a material which is hard enough to serve as a working face for the punch or die.

I claim:

1. A die set which comprises a plurality of die members each with a reduced cylindrical extension adjacent the working face of the die, and a matrix flowed around said die members while molten, and allowed to solidify, said cylindrical extensions extending beyond the surface of the matrix material.

2. A punch set which comprises a plurality of punch guide members, each with a reduced cylindrical extension adjacent the working face of the punch, and a matrix flowed around said punch members while molten, and allowed to solidify, said cylindrical extensions extending beyond the surface of the matrix material.

3. A die set comprising a plurality of hardened die units and a matrix solidified in place about said units, each unit having a working face for cooperation with corresponding punch units, said die units having their working faces lying substantially in a common plane and having templet-engaging means for accurate die locating engagement with positioning means in a templet in a plane adjacent the plane of the working faces to locate and hold them in proper spaced relation with respect to each other while causing nonsolidified solidifiable matrix material to be placed around said units and allowing said material to solidify.

4. A punch set comprising a plurality of hardened punch units and a matrix solidified in place about said units, each unit having a working face for cooperation with corresponding die units, said punch units having their working faces lying substantially in a common plane and having templet-engaging means for accurate punch locating engagement with positioning means in a templet in a plane adjacent the plane of the working faces to locate and hold them in proper spaced relation with respect to each other while causing nonsolidified solidifiable matrix material to be placed around said units and allowing said material to solidify.

5. A punch set comprising a punch guide sleeve, a punch slidable therein, and matrix material solidified in place around said sleeve.

6. A punch set comprising a punch guide sleeve for guiding a punch slidable therein, and matrix material solidified in place around said sleeve.

7. A punch set comprising a plurality of punch guide sleeves, a plurality of punches, one slidable in each sleeve, and matrix material solidified in place around said sleeves.

8. A punch set comprising a plurality of punch guide sleeves, a plurality of punches, one slidable in each sleeve, and matrix material solidified in place around said sleeves, each sleeve having a portion brought into engagement with the work in the punching operation.

9. A punch set comprising a plurality of punch guide sleeves, a plurality of punches, one slidable in each sleeve, matrix material solidified in place around said sleeves, and resilient means bearing on each sleeve for returning each punch after the punching operation.

10. A punch set comprising a plurality of punch guide sleeves, a plurality of punches, one slidable in each sleeve, matrix material solidified in place around said sleeves, each sleeve having a portion brought into engagement with the work in the punching operation, and resilient means bearing on each sleeve for returning each punch after the punching operation.

11. A punch set comprising a plurality of punch guide sleeves, a plurality of punches, one slidable in each sleeve, and matrix material solidified in place around said sleeves, each sleeve having a portion brought into engagement with the work in the punching operation and each punch being movable by the ram of the press to effect the punching operation after the sleeve has engaged the work.

12. A punch set comprising a plurality of punch guide sleeves, a plurality of punches, one slidable in each sleeve, matrix material solidified in place around said sleeves, and resilient means bearing on each sleeve for returning each punch after the punching operation, each punch being movable by the ram of the press to effect the punching operation after the sleeve has engaged the work.

13. A punch set comprising a plurality of punch guide sleeves, a plurality of punches, one slidable in each sleeve, matrix material solidified in place around said sleeves, each sleeve having a portion brought into engagement with the work in the punching operation, and resilient means bearing on each sleeve for returning each punch after the punching operation, each punch being movable by the ram of the press to effect the punching operation after the sleeve has engaged the work.

14. A die set comprising a plurality of hardened die sleeves, each having an external cylindrical formation for engaging round holes in a positioning templet, and matrix material solidified in place around said die sleeves.

15. A punch set comprising a punch guide sleeve, a punch slidable therein, and matrix material solidified in place around said sleeve, said sleeve having an external cylindrical formation for engaging a round hole in a templet used in positioning said sleeves during the solidification of said matrix.

16. A die set comprising a plurality of hardened die sleeves, each having an external cylindrical formation for engaging round holes in a positioning templet, and matrix material solidified in place around said die sleeves, said cylindrical formations being of the same diameter and the punch receiving openings in the sleeves being of different diameters.

17. A punch set comprising a punch guide sleeve, a punch slidable therein, and matrix material solidified in place around said sleeve, said sleeve having an external cylindrical formation for engaging a round hole in a templet used in positioning said sleeves during the solidification of said matrix, said cylindrical formations being of the same diameter and said punches being of different diameters.

18. A die set which comprises a plurality of punches, dies, and gauge pins in correct positional relationship to each other, said punches, dies, and gauge pins having positioning means for accurate locating engagement with templet means used in locating said punches, dies, and gauge pins in permanently securing them in position.

19. A punch and die construction comprising an element for exerting pressure on the punches to effect the punching operation, a punch carrier and stripper plate element having a limited lost motion connection with said pressure exerting element and engaged with the work in the punching operation, a plurality of punches slidably mounted on said carrier element and relatively positioned thereby and engaged by said pressure exerting element in the punching operation, and resilient retracting means acting between said punches and said carrier element for withdrawing the work faces of the punch into the stripper plate element after the punching operation, said lost motion connection having provisions to insure the separation of the stripper plate from the dies after the punching operation and to enable the pressure exerting element to cause the punches to project from said stripper element and act on the work in the punching operation.

20. A punch and die construction comprising an element for exerting pressure on the punches to effect the punching operation, a punch carrier and stripper plate element having a limited lost motion connection with said pressure exerting element and engaged with the work in the punching operation, a plurality of punches slidably mounted on said carrier element and relatively positioned thereby and engaged by said pressure exerting element in the punching operation, and resilient retracting means individual to each punch acting between said punches and said carrier element for withdrawing the work faces of the punch into the stripper plate element after the punching operation, said lost motion connection having provisions to insure the separation of the stripper plate from the dies after the punching operation and to enable the pressure exerting element to cause the punches to project from said stripper element and act on the work in the punching operation.

21. A die construction comprising a plurality of hardened die elements, a matrix in which said elements are embedded formed of solidifiable solidified matrix material placed around said units while unsolidified and allowed to harden, said die elements having positioning means above said matrix material adjacent the plane of the working faces of the die elements for accurate die-locating engagement with templet means used in locating the die elements and holding them in proper spaced relation while the matrix material is being applied and while it is solidifying.

22. A punch and die construction comprising an assembly readily movable into and out of the space between the ram element and the table element of a press, said assembly comprising a plurality of punches, a plurality of punch-guide and stripper sleeves, one for each punch, in which the punch is slidably mounted, the working face of the punch being withdrawable into the sleeve for the stripping action, a plate having openings in which said sleeves are mounted and through which said sleeves extend, the ends of the sleeves extending beyond the plate for engagement with the work in the punching action, the thickness of said plate being not less than the diameter of the plate opening, a plurality of die sleeves, one for each punch, a plate having openings in which said sleeves are mounted, the thickness of said plate being not less than the diameter of the plate opening, said sleeves extending beyond the plate for engagement with the work in the punching action, the driven ends of said punches extending from their mounting plate and being engageable by one of said press elements in the punching action, and individual spring elements, one for each punch surrounding the extended end of the punch and acting between the punch-guide sleeve and the punch to withdraw the working end of the punch into the stripper sleeve, said punches being readily withdrawable from said punch-guide sleeves when the assembly is removed from the press.

23. A punch and die construction comprising an assembly readily movable into and out of the space between the ram element and the table element of a press, said assembly comprising a plurality of punches, a plurality of punch-guide and stripper sleeves, one for each punch, in which the punch is slidably mounted, the working face of the punch being withdrawable into the sleeve for the stripping action, a plate having openings in which said sleeves are mounted and through which said sleeves extend, the ends of the sleeves extending beyond the plate for engagement with the work in the punching action, the thickness of said plate being not less than the diameter of the plate opening, a plurality of die sleeves, one for each punch, a plate having openings in which said sleeves are mounted, the thickness of said plate being not less than the diameter of the plate opening, said sleeves extending beyond the plate for engagement with the work in the punching action, the driven ends of said punches extending from their mounting plate and being engageable by one of said press elements in the punching action, and spring means to withdraw the working end of the punch into the stripper sleeve, said punches being readily withdrawable from said punch guide sleeves when the assembly is removed from the press.

24. A punch and die construction comprising an assembly readily movable into and out of the space between the ram element and the table element of a press, said assembly comprising a plurality of punches, a plurality of punch-guide and stripper sleeves, one for each punch, in which the punch is slidably mounted, the working face of the punch being withdrawable into the sleeve for the stripping action, a plate having openings in which said sleeves are mounted and through which said sleeves extend, the ends of the sleeves extending beyond the plate for engagement with the work in the punching action, a plurality of die sleeves, one for each punch, a plate having openings in which said sleeves are mounted, said sleeves extending beyond the plate for engagement with the work in the punching action, the driven ends of said punches extending from their mounting plate and being engageable by one of said press elements in the punching action, and individual rubbery spring elements, one for each punch surrounding the extended end of the punch and acting to withdraw the working end of the punch into the stripper sleeve and to support the upper end of the punch laterally.

25. A punch and die construction comprising an assembly readily movable into and out of the space between the ram element and the table element of a press, said assembly comprising a plurality of punches, a plurality of punch-guide and stripper sleeves, one for each punch, in which the punch is slidably mounted, the working face of the punch being withdrawable into the sleeve for the stripping action, a plate having openings in which said sleeves are mounted and through which said sleeves extend, the ends of the sleeves extending beyond the plate for engagement with the work in the punching action, a plurality of die sleeves, one for each punch, a plate having openings in which said sleeves are mounted, said sleeves extending beyond the plate for engagement with the work in the punching action, the driven ends of said punches extending from their mounting plate and being engageable by one of said press elements in the punching action, and individual rubbery spring elements, one for each punch surrounding the extended end of the punch and acting to withdraw the working end of the punch into the stripper sleeve and to support the upper end of the punch laterally, said punches being readily withdrawable from said punch guide sleeves when the assembly is removed from the press.

26. A punch construction comprising an assembly readily movable into and out of the space between the ram element and the table element of a press, said assembly comprising a plurality of punches, a plurality of punch-guide and stripper sleeves, one for each punch, in which the punch is slidably mounted, the working face of the punch being withdrawable into the sleeve for the stripping action, a plate having openings in which said sleeves are mounted and through which said sleeves extend, the ends of the sleeves extending for engagement with the work in the punching action, the thickness of said plate being not less than the diameter of the plate opening, the driven ends of said punches extending from their mounting plate and being engageable by one of said press elements in the punching action, and individual spring elements, one for each punch surrounding the extended end of the punch and acting between the punch-guide sleeve and the punch to withdraw the working end of the punch into the stripper sleeve, said punches being readily withdrawable from said punch-guide sleeves when the assembly is removed from the press.

27. A punch construction comprising an assembly readily movable into and out of the space between the ram element and the table element of a press, said assembly comprising a plurality of punches, a plurality of punch-guide and stripper sleeves, one for each punch, in which the punch is slidably mounted, the working face of the punch being withdrawable into the sleeve for the stripping action, a plate having openings in which said sleeves are mounted and through which said sleeves extend, the ends of the sleeves extending for engagement with the work in the punching action, the thickness of said plate being not less than the diameter of the plate opening, the driven ends of said punches extending from their mounting plate and being engageable by one of said press elements in the punching action, and individual spring elements, one for each punch surrounding the extended end of the punch and acting between the punch-guide sleeve and the punch to withdraw the working end of the punch into the stripper sleeve.

28. A punch construction comprising an assembly readily movable into and out of the space between the ram element and the table element of a press, said assembly comprising a plurality of punches, a plurality of punch-guide and stripper sleeves, one for each punch, in which the punch is slidably mounted, the working face of the punch being withdrawable into the sleeve for the stripping action, a plate having openings in which said sleeves are mounted and through which said sleeves extend, the ends of the sleeves extending for engagement with the work in the punching action, the thickness of said plate being not less than the diameter of the plate opening, the driven ends of said punches extending from their mounting plate and being engageable by one of said press elements in the punching action, and spring means to withdraw the working end of the punch into the stripper sleeve.

29. A punch construction comprising an assembly readily movable into and out of the space between the ram element and the table element of a press, said assembly comprising a plurality of punches, a plurality of punch-guide and stripper sleeves, one for each punch, in which the punch is slidably mounted, the working face of the punch being withdrawable into the sleeve for the stripping action, a plate having openings in which said sleeves are mounted and through which said sleeves extend, the ends of the sleeves extending for engagement with the work in the punching action, the thickness of said plate being not less than the diameter of the plate opening, the driven ends of said punches extending from their mounting plate and being engageable by one of said press elements in the punching action, and spring means to withdraw the working end of the punch into the stripper sleeve, said sleeve and plate having interengaging annular shoulders to hold the sleeve in the plate.

30. A punch construction comprising an assembly readily movable into and out of the space between the ram element and the table element of a press, said assembly comprising a plurality of punches, a plurality of punch-guide and stripper sleeves, one for each punch, in which the punch is slidably mounted, the working face of the punch being withdrawable into the sleeve for the stripping action, a plate having openings in which said sleeves are mounted and through which said sleeves extend, the ends of the sleeves extending for engagement with the work in the punching action, the thickness of said plate being not less than the diameter of the plate opening, the driven ends of said punches extending from their mounting plate and being engageable by one of said press elements in the punching action, and individual rubbery spring elements, one for each punch surrounding the extended end of the punch and acting between the punch-guide sleeve and the punch to withdraw the working end of the punch into the stripper sleeve and to support the upper end of the punch laterally.

WESLEY WILSON.